United States Patent [19]

McMickle

[11] 3,796,391

[45] Mar. 12, 1974

[54] SPINNING REEL WITH AUTOMATIC CHANGEOVER OF OPERATION MODE

[75] Inventor: Robert L. McMickle, Redondo Beach, Calif.

[73] Assignee: Berkley & Company, Inc., Spirit Lake, Iowa

[22] Filed: June 7, 1971

[21] Appl. No.: 150,630

Related U.S. Application Data

[63] Continuation-in-part of Ser. No. 833,561, June 16, 1969, abandoned.

[52] U.S. Cl.............................................. 242/84.21 A
[51] Int. Cl............................................... A01k 89/00
[58] Field of Search..... 242/84.2 R, 84.2 A, 84.2 G, 242/84.21 A, 84.21 R

[56]  References Cited
UNITED STATES PATENTS

| | | | |
|---|---|---|---|
| 2,602,603 | 7/1952 | Blissit | 242/84.2 A |
| 2,586,921 | 2/1952 | Delphon | 242/84.2 A |
| 2,713,463 | 7/1955 | Sarah | 242/84.21 R |
| 2,942,798 | 6/1960 | Alinari | 242/84.2 G |
| 3,095,158 | 6/1963 | Louison | 242/84.21 A |
| 3,141,629 | 12/1965 | Rouanet | 242/84.21 R |

*Primary Examiner*—Billy S. Taylor

[57] ABSTRACT

An open-face spinning reel including means for automatically changing the operational mode from a casting mode to a line retrieval mode. The reel structure includes a frame means along with a centrally disposed spindle having means thereon for retaining a line spool mount. A line spool is normally received and disposed on the line spool mounting means and means are provided for actuating the reel to retrieve the line onto the line spool. A normally retracted control lever is coupled to the frame means, with the control lever being operable by the user from the hand other than that which operates the line retrieval crank. The control lever is adapted to advance a slidable housing sleeve or winding hub assembly outwardly to correspondingly advance the line receiving spool outwardly along the spindle. In one embodiment, a resilient ring is provided along the outer periphery of the housing sleeve, with the resilient ring being adapted to contact the pay-out lip of the line receiving spool to controlably arrest the rate of pay-out of line. Means are also provided for retaining the line spool mounting means along with the line spool in its most forward advanced position whenever the control lever has been fully actuated. In the changeover of operation mode from line retrieval to casting, the bail is rocked from a stable closed line retrieval position into a stable open line casting position, with the bail being automatically returned to the closed line retrieval position following initial rotation of the crank and with the line spool in its most forward advanced position.

13 Claims, 17 Drawing Figures

PATENTED MAR 12 1974

INVENTOR
ROBERT L. McMICKLE
BY William T. O'Neil
AGENT

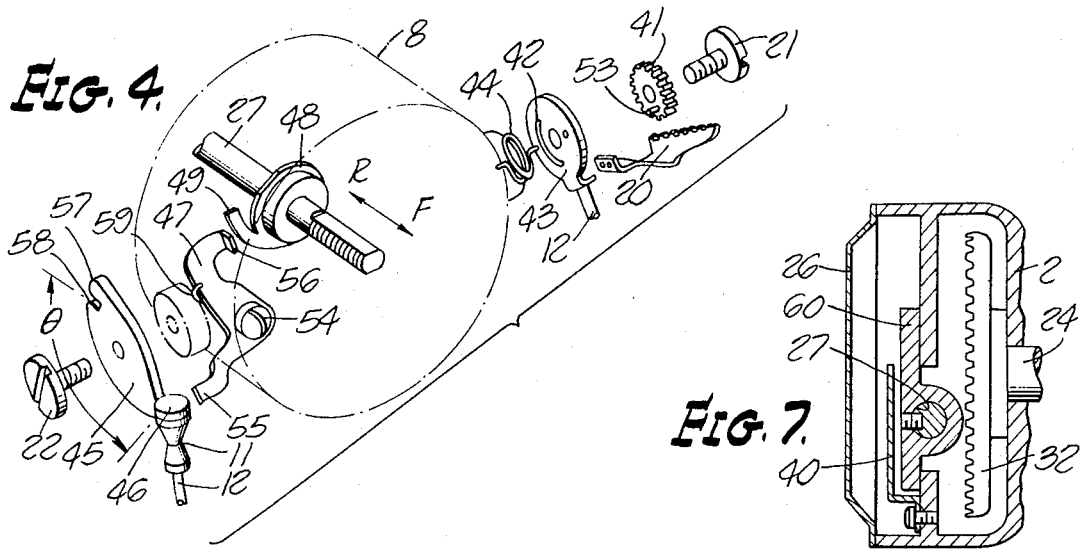
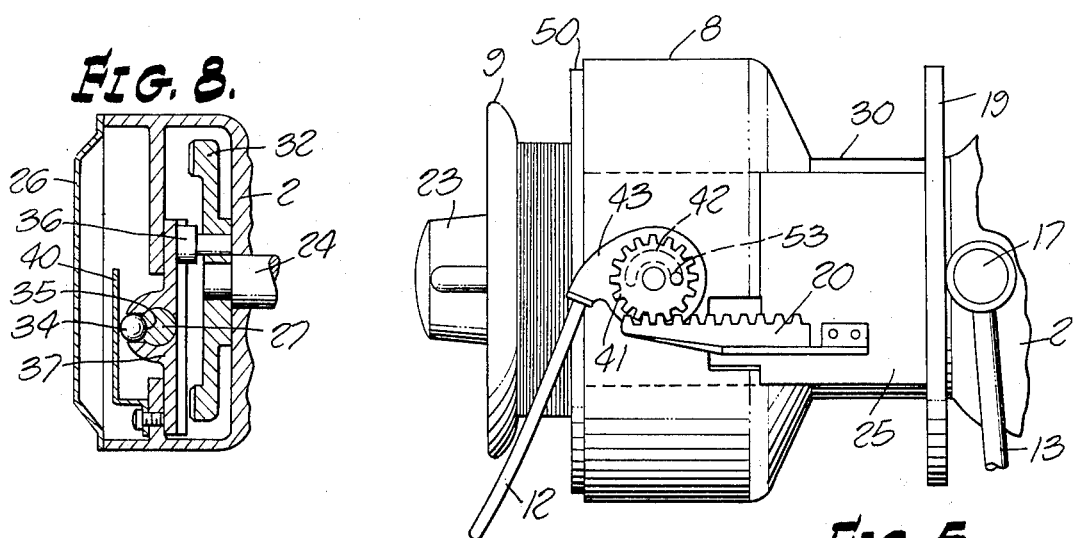
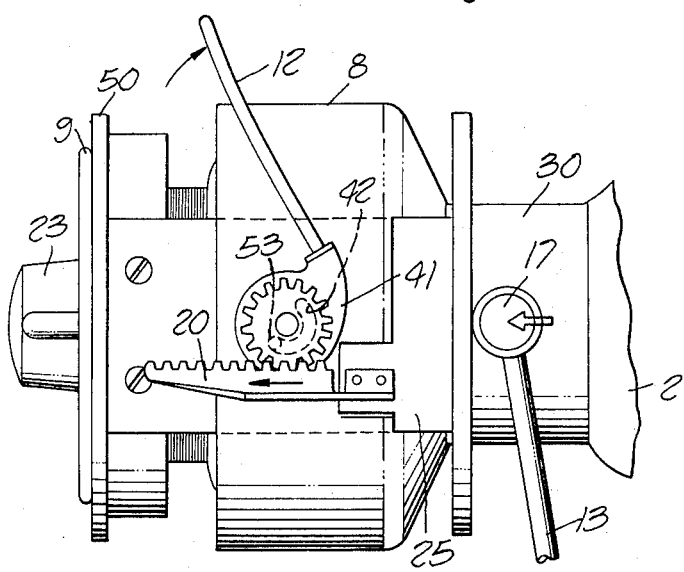
INVENTOR
ROBERT L. McMICKLE
BY *William T. O'Neil*
AGENT

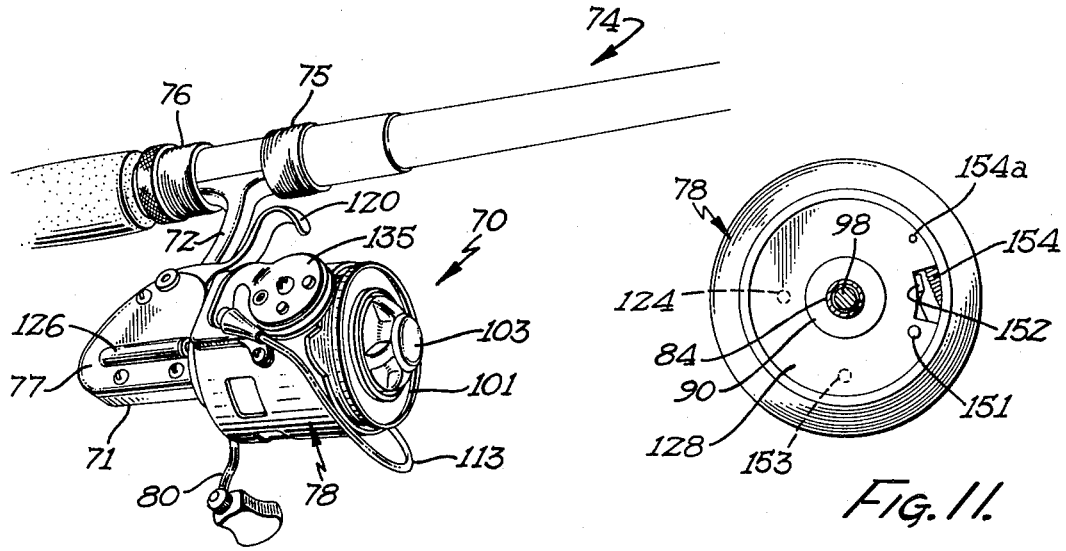
Fig. 9.
Fig. 11.
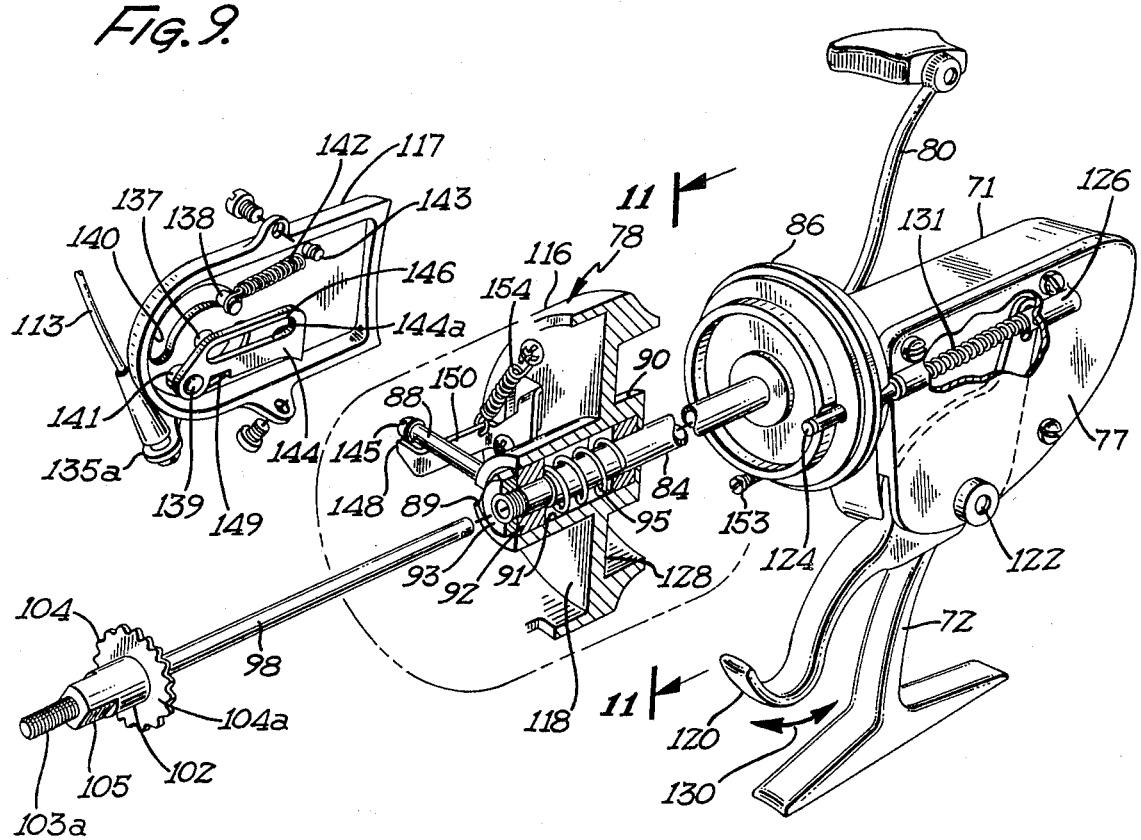
Fig. 10.
INVENTOR.
ROBERT L. McMICKLE
BY
Orrin M. Haugen
ATTORNEY INVENTOR.
ROBERT L. McMICKLE
BY
Orrin M. Haugen
ATTORNEY

SPINNING REEL WITH AUTOMATIC CHANGEOVER OF OPERATION MODE

CROSS-REFERENCE TO RELATED APPLICATION

The present application is a continuation-in-part of my co-pending application Ser. No. 833,561, filed June 16, 1969, entitled "SPINNING REEL WITH AUTOMATIC CHANGEOVER OF OPERATION MODE" now abandoned.

BACKGROUND OF THE INVENTION

1. Field of the Invention

The present invention relates to fishing reel structures, particularly fishing reel structures of the open-face type. More particularly, the present invention relates to an improved spinning reel structure having means for simply, conveniently and reliably changing the operational mode from a line retrieving mode to a line casting mode.

2. Description of the Prior Art

At the present time, spin type fishing reels including open-face spinning reels, are in wide use in sport fishing. Open-face spinning reels normally employ a winding hub assembly which is adapted for axial rotation about a line receiving spool. The line receiving spool of such a reel is frequently adapted for reciprocatory to-and-fro motion within the structure, while at the same time being resistant to free axial rotation. As such, the line receiving spool may take up the line on a level winding or filling basis, while resisting outward dispensing of the line unless a backward pull or resistance exceeding a certain predetermined maximum is experienced. Reference is made to that certain periodical entitled "Consumer Reports," Consumers Union of the United States, Inc., 256 Washington Street, Mount Vernon, New York 10550, Volume 34, No. 6, June, 1969. This periodical defines spinning reel structures, and describes the basic functions of the various components and sub-assemblies. Spinning reels are, of course, commercially available and well known in the prior art.

Open-face spinning reels normally employ a winding hub assembly which incorporates a bail and line guide assembly. The bail is normally rockable between a stable open or line casting mode and a stable closed or line retrieval mode, with the user frequently changing these modes in the course of his activity. For example, in the line casting mode, the bail is retracted so as to free the line for pay-out from the line receiving spool in response to motion imparted to the lure at the end of the line. In the line retrieval mode, the bail is disposed in a position to capture the line whereby rotation of the winding hub assembly accomplishes winding of the line onto the core of the line receiving spool.

In casting, the line which is retained on the line receiving spool pays out from the spool in response to the whipping action of the rod, with the line unwinding from the spool. The spool may utilize a flared forward lip to reduce friction between the line and the surfaces of the reel structure. If control or arrest of line pay-out is desired to limit an overcast or otherwise control the range of the cast, or to otherwise reduce the rate of line pay-out, such control is normally controlled or exercized by application of finger or thumb pressure directly to the unwinding coil of line retained on the line receiving spool. Such a procedure is normally inexact and difficult to execute. By means of one feature or aspect of the structure of the present invention, the problem of controlling line pay-out is minimized.

In the past, open-face spinning reels have sometimes included triggering mechanisms whereby the bail is closed (erected) in response to rotation of the hand crank upon commencement of a line retrieval operation. This function effects changeover from the casting mode to the line retrieval mode of operation. The bail, in closing by toggle or snap action, captures the line and frequently threads the incoming line over a line guide member. Both the line guide and the bail are normally coupled at least operatively to a winding hub assembly, and are adapted to position the line in an axial position so that rotation of the bail and line guide relative to the line receiving spool wraps the line onto the spool without requiring rotation of the spool. Frequently, open-face spinning reels are provided with means for providing axial reciprocation of the spool with these means being coupled to the re-winding mechanism.

Because of the random nature of the operation, the final axial disposition of an axially reciprocating line receiving spool is not determined until the line retrieval operation has been completed. The line receiving spool may be disposed at any position within the limitation of a fully extended or fully retracted position. For consistency of operation, the fisherman prefers that the line receiving spool be in the fully extended or advanced position when he is casting the lure outwardly. In presently available devices, the fisherman normally is required to rotate the crank either in a forward or reverse direction so as to pre-set the spool in this desired fully extended or advanced position. Upon undertaking this adjustment, the lure is necessarily positioned at a certain distance from the tip of the rod, with this positioning being both inconvenient to the user, and dangerous to those about him.

In the apparatus of the present invention, the line receiving spool is positioned at its fully extended or advanced position upon actuation of a conveniently positioned control lever in the housing assembly of the reel. Actuation of the lever accomplishes automatic positioning of the line receiving spool, and if desired, means may be provided for snubbing the line as the rod is retracted or thrown back in the initial motions of a cast, with controlable snubbing of the line being possible as the line pays out from the spool. This action occurs in response to a simple motion of the control lever, thus providing for simple and effective control of the line, along with effective pre-positioning of the line receiving spool during the casting operation.

Presently available prior art spinning reel structures normally provide for immediate closing of the bail upon initial rotation of the crank in the line retrieval. In such structures, the initial crank motion during line retrieval is normally inhibited by a cam and detent mechanism or the like, and may therefore not be easily and smoothly accomplished. Furthermore, since such a mechanism is normally on the verge of operation, accidental contact with the device during casting may result in inadvertent snap closing of the bail. Such motion of the bail may unduly stress and disturb the line which continues to pay out. In the present invention, the changeover from the casting mode to the line retrieval mode is accomplished only after a certain minimum rotation of the crank, thereby eliminating the danger of accidental triggering of the bail. Moreover, the mechanical inertia of the gears and rotating hub assembly is then available to effect a smooth transition from the casting to the retrieval mode.

While fishing, the fisherman normally grips the rod with one hand while using the other hand on the handle of the reel crank for line retrieval. The hand which is used for each of those functions is personal to the fisherman and normally depends on whether he is right or left handed. Accordingly, spinning reels have traditionally been constructed and made available with cranks on either the right or the left side to accommodate the individual's desires. The present invention does not restrict the use of either alternative.

Other desirable features normally employed in spinning reels may be advantageously incorporated in reels of the present invention. For example, an adjustable drag feature may be incorporated in the reel whereby the line spool is permitted a control rotation on its shaft with greater or less frictional drag to allow for "playing" a fish. Such are fully compatible with the structures of the present invention.

SUMMARY OF THE INVENTION

The primary objective of the present invention is to produce an improved open-face spinning reel with smooth automatic changeover of operational modes and with means for controlling pay-out of line.

The reel structures incorporating features of the present invention are designed to function with a single actuating lever which provides functional control of the spinning reels, and these structures will be described in detail hereinafter.

The spinning reel of the invention is mounted with its main shaft or spindle disposed along an axis arranged generally parallel to the axis of the fishing rod shaft. A suitable gear arrangement or mechanism converts the rotation of the line retrieval crank to rotation of the winding hub assembly. The line spool is preferably secured to line spool mounting means associated with the main shaft or spindle of the reel and is adapted to reciprocate axially to impart desired motion to the spool and is also adapted to allow for forward pre-positioning of the spool during casting.

At the beginning of each cast, it is desirable to snub the line and prevent its free pay-out until the fishing rod throw reaches an optimum point in the forward portion of the motion cycle. Thus, at the beginning of each cast, the fisherman may actuate the mechanism for advancing the line spool to a forward disposition. At this point, means are provided adjacent the forward or leading edge of the winding hub assembly for snubbing the line against the forward or pay-out lip of the line spool. Subsequently, and during the casting operation, the lever is released so as to free the line for normal pay-out. At the termination of the casting operation, the lever may again be actuated in order to retard or arrest the pay-out at the appropriate moment. It will be appreciated that release of the lever mechanism at any point during the cast does not permit the line spool to recede into the winding hub assembly, since the line spool mounting means is normally retained in this advanced disposition until it is retracted during initiation of the retrieval mode.

It will be observed that the actuating lever of the structures of the present invention may be located so that operation is possible by the hand gripping the fishing rod. During this casting effort, therefore, the free hand is available for commencing operation of the crank upon completion of the casting operation.

One of the primary features of the present invention is the control or actuating lever and an associated winding hub assembly which comprises a rotating hub with a slidable sleeve housing arranged to be advanced by manipulation of the lever. This advancement brings the leading edge portion of the rotating hub into contact with the forward flange of the line receiving spool and upon continued actuation of the lever, the line spool is advanced along the mounting means to the most forward disposition. Another important feature of the present invention is the temporary disengagement of the reciprocation drive from the spindle retaining the line spool. Maximum advancement of the line spool provides a desirable re-engagement delay as the crank is initially turned, until, with continued turning, the reciprocation drive and detent "catch up" with the advanced disposition of the line spool and its mounting means.

It will be appreciated that the primary features of the present invention are most effectively applied to the structure of the spinning reel in combination; however, it will be apparent that even incorporation of certain selected or specific features effects a significant advance in the state of this art.

BRIEF DESCRIPTION OF THE DRAWINGS

FIG. 4 is an exploded view illustrating details of line spool reciprocation mechanism and bail control mechanism details of the device of FIG. 1;

FIG. 5 is a partial elevational view of the forward portion of the device of FIG. 1 and showing the rack and pinion structure used to control the bail and with the line bail in "closed" disposition;

FIG. 6 is a partial elevational view similar to FIG. 5, and showing the line bail in "open" disposition;

FIG. 7 is a vertical sectional view taken along the line and in the direction of the arrows 7—7 of FIG. 2;

FIG. 8 is a vertical sectional view taken along the line and in the direction of the arrows 8—8 of FIG. 2;

FIG. 9 is a perspective view of a modified form of spinning reel incorporating the concepts of the present invention, with the reel shown attached to a segment of a fishing rod;

FIG. 10 is an exploded perspective view of the structure shown in FIG. 9, with portions of the structure being shown in vertical section, and with certain components being broken away to more clearly illustrate the function of the apparatus;

FIG. 11 is a vertical sectional view taken along the line and in the direction of the arrows 11—11 of FIG. 10, and illustrating the details of the inner surface of the winding hub portion of the apparatus;

FIG. 17 is a detail side elevational view showing one component of the reciprocating mechanism of the structure shown in FIG. 13.

DESCRIPTION OF ONE OF THE PREFERRED EMBODIMENTS

Figure 1:
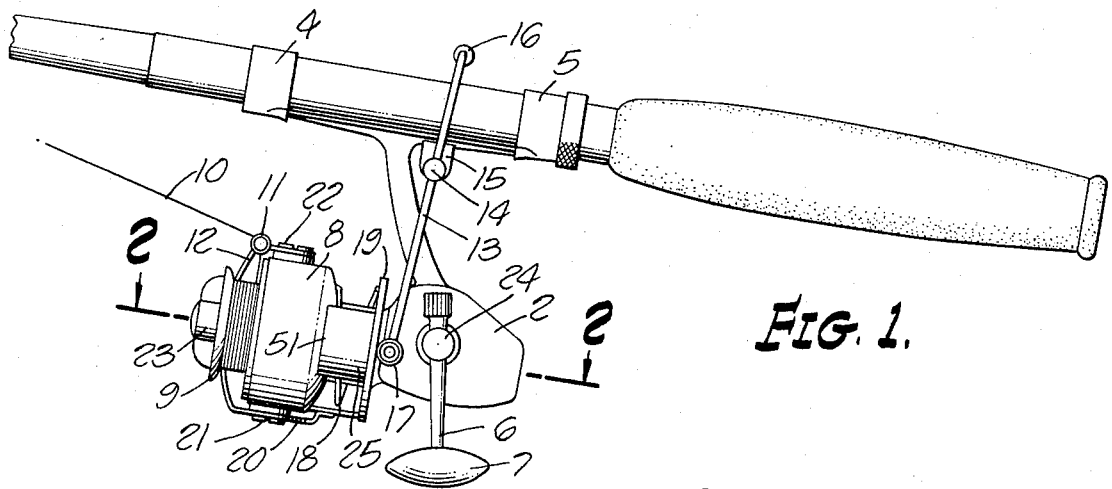
FIG. 1 is a side elevational view of one modification of a reel fabricated in accordance with the present invention and mounted on a fishing rod handle, with the forward portion of the rod broken away.

Referring now to FIG. 1, a spinning reel fabricated according to the present invention is shown mounted on a typical fishing rod handle, the rod being shown for purposes of clarity and not forming a part of the present invention.

In FIG. 1, a structural member 1 is shown, this member being firmly attached to or forming an integral part of the gear case 2 of the reel assembly. The reel body is attached to the rod by conventional means, such as by integral shoe piece 3, with shoe 3 being held under rod sleeves 4 and 5. The reel includes a crank assembly 6, rotatable about a crank shaft hub 24 and with rotatable winding handle 7 for use by the fisherman with his left hand for winding this crank for line retrieval while the rod is being held in the right hand. It is understood that the reel may be fabricated with this crank disposed on either side of the gear case 2 for accommodating the personal desires of the user.

A sleeve housing 25 and an axially fixed housing shell 8 are provided and adapted for rotation about the axis of the line spool 9 as the crank 6 is turned for line retrieval, with the line 10 being captured by bail 12 and passing over the line guide 11 as shown in FIG. 1. Bail 12 and line guide 11 rotate with shell 8, and the line is thereby wound onto spool 9. The shanks of the screws 21 and 22 function as rotary bearing points and are accordingly the centers of rotation for the bail 12. An internal mechanism causes the line spool to reciprocate axially, but as in spinning reels generally, the spool does not rotate about its central core axis, except as controllably permitted by the adjustable drag mechanism. Such rotation may occur during the line retrieval mode when the force of the drag friction is overcome by tension in the line.

Bail 12 may be swung away free from the line into an "open" disposition. This is the position for casting, i.e., whereby the line may freely pay out from the spool end. In FIG. 1, the bail 12 is shown in the "closed" or rewind position. The line guide 11 is preferably rotatable, that is, it is preferably a miniature pulley, to reduce the sliding friction which may cause line wear.

In paying out over the lip 9 of the forward flange of the line spool during casting, the fisherman using a presently available open-face spinning reel is obliged to use his fingers to snub the line and arrest its pay-out, since the normal line drag provisions are not operative unless the reel is in the re-wind or line retrieval mode of operation. One significant feature of the present invention is the automatic line snubbing which is achieved in the structure of the device shown in FIG. 1 by operation of the lever 13. This lever 13 is secured to the reel body at a fulcrum 14 formed in a bearing block 15, with bearing block 15 being in turn firmly attached to the integral structural members 1 and 3. Lever 13 may be rockably operated, for example by the thumb of the hand holding the rod pulling rearward at 16. Rearward in this context is toward the handle end of the fishing rod. When this motion occurs, the sleeve housing 25 is advanced toward the open end of the spool 9 by pressure from the roller 17. Roller 17 is preferably duplicated on both sides of the reel as at 17a, thus bearing symmetrically against the rear ring 19 of the housing 25. In this event, the lever 13 is preferably formed as a "U" shaped yoke, and 13a forms its opposite leg or side. The butt of the yoke is then at thumb handle 16. In certain structures, however, a one-sided lever would be functional. Since the ring 19 and its housing 25 may be rotating when the lever 13 is being actuated, roller 17 is normally preferable to a simple friction cap. However, nylon or similar plastic parts may be utilized in lieu of rollers. The gear rack 20 is shown in relation to other parts, and provides automatic bail opening when the sleeve housing 25 is advanced.

A relatively light compression spring 18 is operative between 19 and the structure of the housing shell 8 to bias the housing 25 into the rearward or normal disposition. This structure will be further described in connection with other figures hereinafter.

A drag adjustment is available in the structure of FIGS. 1–8, with the knob 23 being illustrated therein. While the device functions well with this structure, the details are not considered a part of the present invention. The drag adjustment shown in the structure of FIGS. 1–8 operates in contact with the main shaft of the reel to provide adjustable rotational friction in the re-wind or retrieval mode of operation. That general expedient is known and is employed in spinning reels which are presently commercially available.

Figure 2:
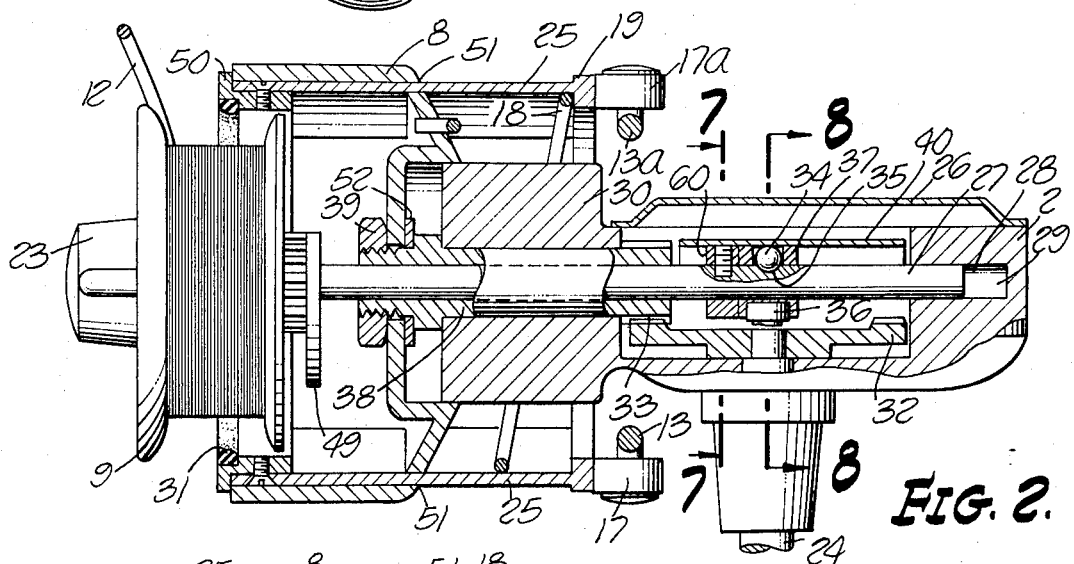
FIG. 2 is a horizontal sectional view of the reel structure taken along the line and in the direction of the arrows 2—2 of FIG. 1, with the winding hub assembly being shown in its normal rearward position, and with the line spool being shown in elevation.
Figure 3:
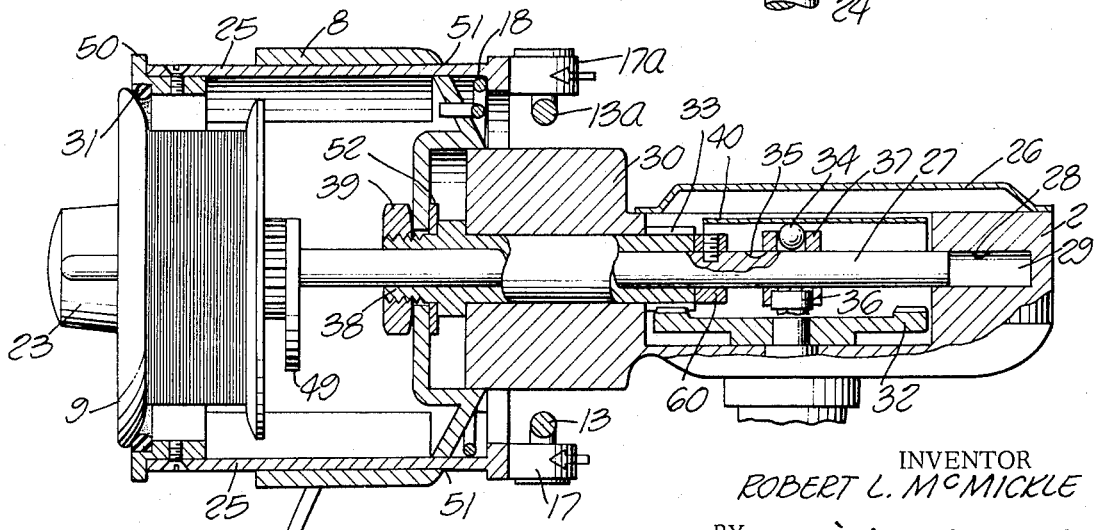
FIG. 3 is a sectional view similar to FIG. 2, however with the winding hub assembly and line spool in the most forward or advanced disposition.

Attention is now directed to FIGS. 2 and 3 of the drawings which illustrate the details of the structure shown in FIG. 1. As indicated, the structure is identical with the differences in the views illustrating the disposition of the components during certain phases of the cycle of operation.

As is indicated, the lever 13, in the form of the "U" shaped yoke, is provided with roller elements 17 and 17a along legs 13 and 13a respectively of the yoke structure. Compression spring 18 bears on the conical inner end surface of housing shell 8, thus providing a normal biasing force which separates ring element 19 from housing shell 8. Preferably, ring element 19 is adapted to slidably move over casting members 30, with casting member 30 being an integral part of gear case casting 2. Stated another way, ring element 19 and its associated components are biased toward the right of FIG. 2. Sleeve housing 25 preferably consists of several strips which are attached to a retaining ring 50 at one end, and to the rear ring 19 at the other end. Normally, these strips resemble pieces of a cylindrical shell cut axially from a cylinder, and in assembly, they pass through corresponding circumferential slots formed in the housing shell 8 with a normal sliding clearance, a typical arrangement being shown at 51 in FIG. 3.

In the operational mode illustrated in FIG. 2, the reciprocating mechanism is illustrated in actual operation, with the line spool being approximately in the center of and generally midway between the traveling limits of its reciprocating motion. At this time in the operation, detent ball 34 will be disposed within the confines of dimple cavity 35 formed along the peripheral surface of spindle or shaft 27. Slide bar 37 is adapted to move relative to shaft 27, with ball 34 being utilized to intermittently couple the sliding motion of slide bar 37 to spindle or shaft 27. Reciprocatory motion is provided for slide bar 37 by means of eccentric drive pin 36 formed integrally with or coupled to ring gear 32. The radial disposition of pin 36 will determine the extent of axial reciprocatory motion in slide bar 37.

Ring gear 32 is in mesh with pinion gear 33, with pinion 33 being fast on the shaft sleeve 38. Rotation of pinion 33 therefore provides rotational motion to shaft sleeve 38. Shaft sleeve 38 is provided with an integral shoulder 52 against which nut 39 secures the inside portion of housing 8 to shaft sleeve 38. Accordingly, rotation of shaft sleeve 38 in turn causes the rotation of housing 8, sleeve housing 25, ring 19, retaining ring 50, and bail member 12. As is apparent from the drawings, housing 8, shaft sleeve 38, and nut 39 remain at a certain predetermined or fixed axial disposition, with these components being adapted for rotation about the axis of spindle or shaft 27.

As indicated in FIG. 2, spindle or shaft 27 has its inner or back tip portion disposed within a bore 28 formed in casting 2. Bore 28 is a blind bore having a bottom surface 29. The depth or length of bore 28 is such that the full extent of axial travel for spindle or shaft 27 may be accommodated. In the disposition of FIG. 2, however, as has been indicated, the spindle or shaft 27 is in approximately its center of motion.

With attention being directed to FIG. 3, it will be seen that this figure illustrates the disposition of the structure at the completion of full actuation of the thumb handle 16. Roller elements 17 and 17a from the generally "U" shaped yoke are pressed against surfaces 25 and 19 pursuant to the direction shown by the arrows in FIG. 3, and as a result of this motion, these components or elements are advanced until contact is achieved between the resilient ring 31 and the forward flange or lip 9 of the line spool. This forward motion of the structure, and the resultant force on the line spool pushes the spool forward to its fully advanced or outermost limit in its normal reciprocation movement. Accordingly, ball 34 is no longer seated within the dimple cavity 35. Ball 34 moves axially, but only in response to turning of crank 6, and remains stationary as spindle or shaft 27 continues to advance along with the line spool structure. Also, in this motion of the spool and spindle or shaft 27, shaft sleeve 33 also remains stationary.

Since there is no force operative to return the line spool and spindle or shaft 27 to the disposition shown in FIG. 2, these elements remain in the extended forward position following release of pressure or force from the thumb handle 16. Also, these elements remain at their advanced or forward position when sleeve housing 25 returns to its rearward position, with this return being accomplished by the force of spring 18. At this point, the structure is in the desired disposition for commencing of line pay-out during casting. It will be appreciated, of course, that resilient ring 31, which may conveniently be fabricated from a rubber "O" ring or the like, may be controlably advanced by the user to arrest, snub, or otherwise control the line pay-out during casting. The bail 12 is rotated to the open or casting position as a result of the forward motion of sleeve housing 25. The details of the bail action are described hereinafter.

The component member 30, which has been described as a casting, acts as a guiding or bearing surface for ring member 19, when ring 19 is caused to slide in an axial direction. Casing member 26 is provided primarily as a dust cover for the gear case and mechanism.

Attention is now directed to FIGS. 4–8 inclusive for a description and explanation of the function of the mechanism when the line retrieval mode is started. At this time, the housing shell 8, housing 25, and ring 19, along with the bail assembly respond in rotational motion, since these components or elements are attached to shaft sleeve 38. As indicated, shaft sleeve 38 is driven from ring gear 32 which is in mesh with pinion gear 33. Reciprocation of the line spool and spindle or shaft 27 does not commence until ball 34 becomes seated in dimple cavity 38.

With attention being directed to FIG. 4, the bail cam mechanism utilized on the structure of FIGS. 1–8 is shown in exploded view. Attention is also directed to FIGS. 5 and 6 which are side elevational views illustrating the motion of the bail rack 20 and bail pinion gear 41. It should be observed that FIGS. 5 and 6 correspond respectively to FIGS. 2 and 3 insofar as bail position and operational modes are concerned. Specifically, in FIG. 5, the bail 12 is illustrated in closed disposition, while in FIG. 6 the bail has been open and the housing 25 has not, as yet, been returned to its rearward position. In FIG. 6, it will be recognized that the handle 16 continues to be actuated to retain housing 25 in the illustrated disposition.

The disposition of the bail pinion gear 41, which is engaged by gear rack 20, corresponds to the two positions as illustrated in FIGS. 5 and 6 respectively. Since gear rack 20 is mounted upon sleeve housing 25, rack 20 moves with sleeve housing 25 between the extreme positions illustrated.

With attention being directed specifically to FIG. 4, the operation and actuation of the bail pinion gear 41 and the bail bracket 43 with its arcuate slot 42 may be fully appreciated. Bail 12 serves to connect the bail bracket 43 and the bail cam member 45 in the same fashion as if a shaft joined or coupled these ends diametrically. The line guide 11 is joined such as by riveting, for example, through a tab member on bail cam 45 turned at right angles to the face of bail cam 45. Torsion spring 44 acts to bias the bail bracket, as well as the bail and cam 45, into the closed disposition. It is torsion spring 44 which provides the snap action response for closing of the bail during changeover from the casting mode to the line retrieval mode as previously indicated and discussed. In the arrangement shown in FIG. 4, bail cam 45 and bracket 43 are shown in the closed disposition. As the rack 20 is advanced according to the sequence of operation of control lever 16, and turns or rotates bail pinion gear 41, a pin member 53 disposed on gear 41 and riding in slot 42 rotates and accordingly cocks the bail into the open position against the torsional force from spring 44. Bail cam 45 also rotates and the tip 55 of the right angle latch 47 correspondingly rides on cam 45 over the indicated angle θ. As the bail is rotated into the open position, tip member 55 rides into the slot 58 and remains there so long as the bail remains open. During this period of time, torsion spring 44 is extended to its maximum length and correspondingly under its maximum tension. The cam tip 57 functions to prevent over-ride of the tip 55 as engagement with the slot 58 is approached. A spring member 59, partially visible behind latch 47, serves to provide a moderate cam riding pressure of the tip 55 on the surface of the cam element 45. The right angle latch part 47 pivots about the shank of screw 54 as a pivot axis. Restoration of gear rack 20 to its rearward position by release of thumb pressure on handle 16 causes the pin 53 to traverse the arcuate slot 42, while no other response is achieved at this time.

At this point in time, it should be recalled that spindle or shaft 27 reciprocates, but does not rotate, while housing 8 does rotate during the line retrieval mode of operation. An arrow around the phantom outline of housing 8 in FIG. 4 indicates the direction of rotation, consistent with the specific mechanisms shown.

A fixed trip cam 48 is located on spindle or shaft 27 as illustrated in such a position that it is not aligned to contact the latch trigger piece 56 during rotation of housing 8 when the spindle or shaft member 27 and its line spool is in the fully extended or advanced position. This disposition is identifiable from the arrow identified "F" in FIG. 4. Also, as previously described, initial rotation of housing 8 precedes the re-establishment of reciprocatory motion of spindle or shaft 27. Thus, there is a dwell period following initiation of operation of crank 6 before ball 34 becomes seated in detent cavity 35, and locks spindle or shaft 27 into reciprocation. A minimum, but variable time of dwell occurs prior to the point in time when spindle or shaft 27 places cam tip 49 in axial alignment with latch trigger piece 56. At this time, latch trigger 56 will ride up onto the cam tip 49, during which action latch 47 is rotated about the shank of screw 54 sufficiently to lift the tip 55 free from notch 58. Accordingly, the bail is then free to return to its normal or closed disposition in response to the force exerted thereon by the spring loading.

Attention is now directed to FIGS. 7 and 8 which illustrate the interior of the gear case for the structure shown in FIGS. 1–8. In FIG. 7, for example, a stabilizer bar 60 is shown which functions as a stop for the spindle or shaft 27 and line spool, this bar contacting an internal shoulder of the gear case 2 when the spool is at its full advanced position.

In FIG. 8, the relationship of the reciprocation drive pin 36 to the ring gear 32 and slide bar 37 is illustrated. Ball 34 is shown in its disposition in dimple cavity 37, and retained therein by spring clip 49. Spring clip 40 is sufficiently long in its axial direction so as to be effective over the full ball travel limits.

It will be appreciated that the structure shown in FIGS. 1-8 may be modified in various forms without losing the value of the novel features. For example, helical gearing may be used in this structure with certain advantages. Also, the configuration of sleeve housing 25 may be modified so as to slide on the outside of housing member 8. Furthermore, the various components and elements associated with cam 45 and bail bracket 43 may be designed for location on the same side of the reel body rather than on opposite sides as is illustrated.

Attention is now directed to FIGS. 9, 10, 11 and 12 of the drawings wherein a modified embodiment of the spinning reel structure is illustrated. Specifically, the spinning reel structure generally designated 70 includes a frame means 71, and a mounting foot 72, the mounting foot providing a means of attachment for the reel 70 onto the rod structure generally designated 74. For example, foot 72 has portions received within mounting sleeves 75 and 76, as indicated in FIG. 9. Frame means 71 include a gear case portion 77 along with a winding hub assembly generally designated 78. Winding hub assembly 78 is operatively coupled to frame means 71, and is adapted to be rotated by the normal manipulation of crank 80.

Figure 13:
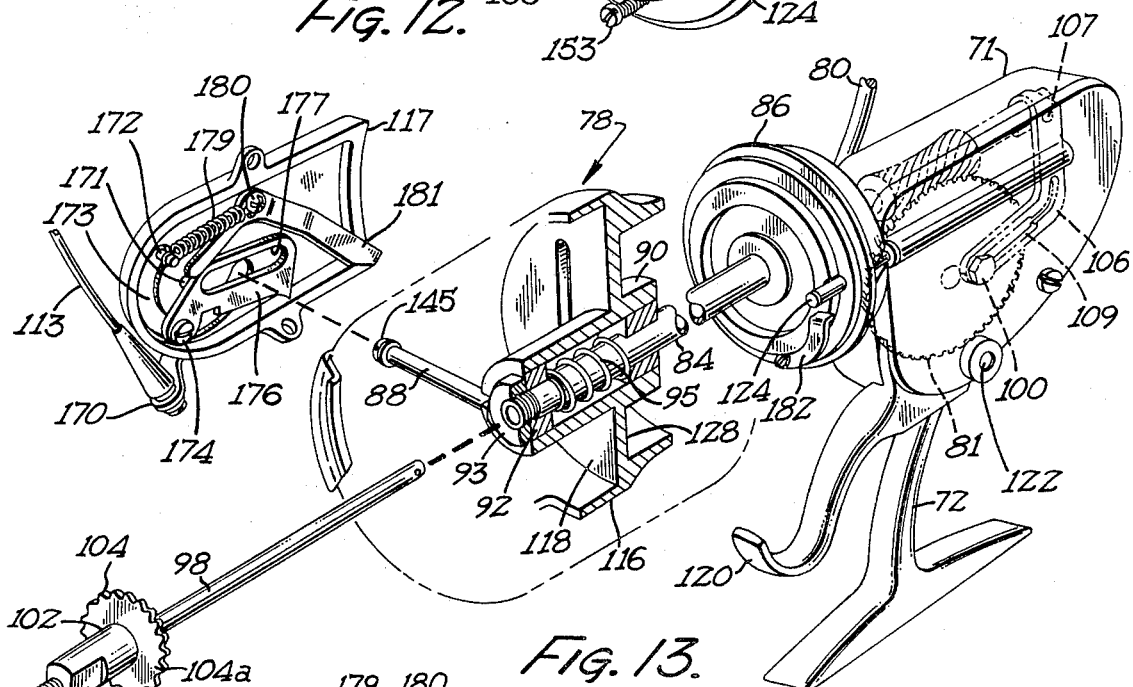
FIG. 13 is a perspective view similar to FIG. 10 and illustrating a modified embodiment of the structure.

Attention is now directed to FIG. 13 of the drawings wherein the drive mechanism for the structure is illustrated in detail. In FIG. 13, a drive gear 81 is fast on crank shaft 82, crank shaft 82 being, in turn, securely coupled to crank 80. Drive gear 81 is in mesh with worm 83, worm 83 being integral or fast with drive sleeve 84. Drive sleeve 84 is appropriately journaled in bearings within abutment face 86 of the case 77. It will be appreciated, of course, that this segment of the drive mechanism is reasonably conventional and the aspects of the present invention may be incorporated in spinning reels utilizing a variety of drive schemes.

With attention being re-directed to FIG. 10 of the drawings, it will be appreciated that rotational motion in drive sleeve 84 will be reflected in corresponding rotational motion in winding hub assembly 78, winding hub assembly 78 being locked against relative rotation with sleeve 84 by means of the combination of post 88 and slot 89. Slot 89 is formed in the core sleeve 90 of winding hub assembly 78, with the inner diameter 91 of sleeve 90 being in sliding engagement with the external or outer diameter of bushing 92. Bushing 92 is secured to nut 93, and hence is fast onto the outer periphery of drive sleeve 84. Compression spring 95 provides a biasing force which normally urges winding hub assembly 78 rearwardly against the exposed surface of abutment face 86.

Spindle or shaft member 98 is disposed coaxially within the confines of drive sleeve 84, and with the rear tip portion thereof being secured to a yoke member or assembly generally designated 99 which couples the spindle 98 for axial reciprocation upon rotation of drive gear 81. A radially disposed eccentric 100, secured to the face of drive gear 81 is utilized to impart reciprocatory motion to the yoke member generally designated 99, through the linkage elements as shown in FIG. 13.

The linkage coupling the spindle member 98 to the drive gear 81 includes an elongated connecting linkage arm 106 which is secured to the rear end or tip of spindle 98 by a suitable yoke and pin arrangement shown at 107. It will be observed that the motion imparted to linkage arm 106 is reflected in reciprocation of spindle 98.

Attention is now directed to the forward portion of arm 106, wherein slot 109 is formed. Slot 109 extends to a relieved area 110 formed in arm 106 for accommodating radially disposed eccentric 100 therewithin. Upon careful study of the structure of the slotted area 109, it will be seen that the normal disposition for radially disposed eccentric 100 is at the lower end of the slot as shown in FIG. 17, the slot having a relieved portion for enclosing eccentric 100 without causing deflection of the bifurcated portions 106a and 106b of arm 106 disposed on opposite sides of slot 109. The deflection is shown in phantom in FIG. 17, with eccentric 100 being shown in phantom within the confines of slot 109, and with portions 106a and 106b being deflected.

Line spool 101 is of conventional design, and is received upon the outer end portion 102 of spindle 98. Retaining nut 103, which functions as a drag adjusting nut, is internally threaded, and is adapted to threadably engage threaded portion 103a of spindle 98. Spur wheel 104 performs a dual purpose of providing a back-up surface as at 104a for the spool 101, with the outer toothed portions being utilized to provide an audible signal with a clicker pick secured to the rear surface of the rear flange of line spool 101. Clicker picks of this type are well known in the art, and are commercially available. The flat portions shown at 105 on the spindle 98 are utilized to mate with portions of the drag mechanism disposed internally of line spool 101. Such drag adjustment devices are commercially available and do not form a part of the present invention, but are shown and described here in order to exemplify the varieties of reel devices which may employ and utilize the aspects of the present invention.

Figure 12:
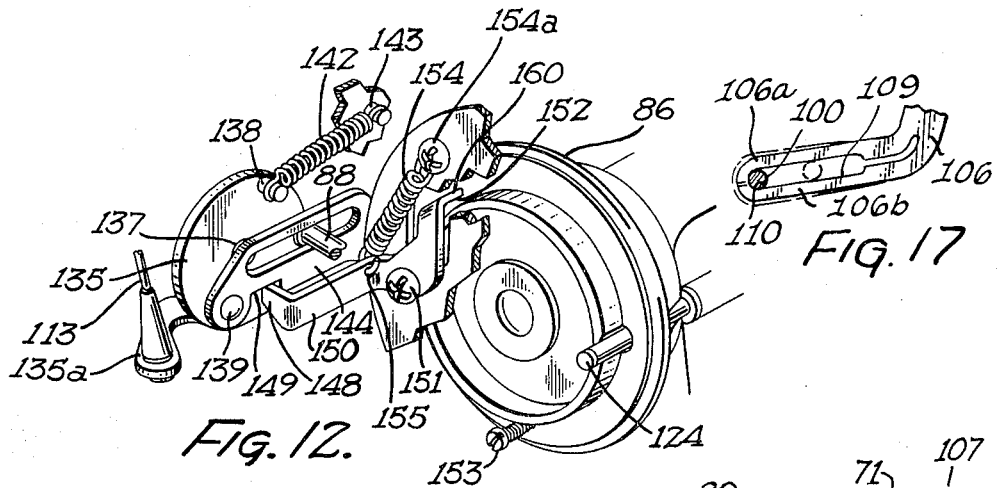
FIG. 12 is a detail perspective view of the bail controlling mechanism of the apparatus shown in FIG. 10, and illustrating the working relationship between the elements included in this portion of the structure.

Reference is made now to FIGS. 10, 11 and 12 wherein the details of the structure forming one embodiment of the winding hub assembly are illustrated. Specifically, a portion of this mechanism is housed within the confines of housing sleeve 116, while certain other components are disposed immediately adjacent the outer periphery of housing sleeve 116, and within shield casing 117. As is apparent in FIG. 10, disc portion 118 functions as a web extending between core sleeve 90 and the outer housing sleeve 116.

With continued attention being directed to FIG. 10 of the drawings, the mechanism for pushing or urging the winding hub assembly 78 axially outwardly will now be described. Specifically, finger actuated control lever 120 is coupled at its fulcrum point 121 to pivot axis or shaft 122. As is apparent in FIG. 10, pivot axis 122 is secured or otherwise mounted within the confines of frame 71 to provide for appropriate motion in control lever 120. The free end of control lever 120 is secured at 123 to push rod 124 through suitable linkage 125 whereby rocking motion of control lever 120 is translated into reciprocatory to-and-fro motion in push rod 124. As indicated, housing portion 126 is provided with an internal bore to receive, accommodate and guide push rod 124 in its reciprocatory to-and-fro motion.

The outer free end of push rod 124 is adapted to make contact with abutment surface 128 of winding hub assembly or housing 78, particularly as shown in FIG. 10. Thus, since surface 128 is continuous in its annular extent, push rod 124 is able to urge housing 78 away from contact with abutment surface 86 in response to motion of control lever 120. Arrow 130 is provided to illustrate the motion available in control lever 120, with a spring bias means 131 being utilized to continuously urge push rod rearwardly and to correspondingly urge control lever 120 in a clockwise direction about pivot axis 122.

With continued attention being directed to FIGS. 10 and 12, the operation of the bail changeover mechanism will now be described. Bail 113 is coupled to winding hub assembly 78 at bail base mounting plate 135, and particularly on the right angled bracket extension 136 of bail base mounting plate 135. The other end of bail 113 is suitably pivotally mounted to an idler base (not shown), normally disposed in diametrically opposed relationship to plate 135. For purposes of dynamic balance, particularly during line retrieval, it is frequently desirable to dispose the mounting points for the bail at a point removed or offset from the diameter, thus providing for dynamic balance between the winding hub assembly and the closed bail during operation. Bail base mounting plate 135 is pivotally secured to housing 117 about pivot pin 137, thus providing for pivotal motion of bracket 136 and its associated bail 113.

With continuing attention to FIG. 10, and specifically that portion of the figure illustrating shield casing 117, it will be seen that the inner surface of bail base mounting plate 135 is provided with a pair of inwardly extending pins 138 and 139. Each pin is secured to plate 135 at a point radially offset from pin 137 and is free to move within arcuate slots 140 and 141. Pin 138 is arranged to receive tension spring member 142 about the periphery thereof, with spring 142 being anchored at its other end to post 143. Pin 139 provides a mounting point for linkage member 144, with link 144 being pivotally secured to pin 139.

With attention now being directed to FIG. 12 of the drawings, it will be seen that the outer free end 145 of post 88 is received within the confines of slot 144a formed in link 144. The axial end portions of slot 144a are adapted to make contact with the free end portion or tip 145 of post 88, and thereby control the ultimate disposition of bail 113. For example, as winding hub assembly 78 is moved axially outwardly from frame 71, the trailing abutment surface 146 of slot 144a will strike tip 145, and continued forward motion of winding hub assembly 78 will result in a counter-clockwise motion in bail base mounting plate 135, as seen and viewed in FIG. 12. Continued motion in the forward direction will ultimately permit the right angled tip of latching dog 148 to engage the latch portion or zone 149 of link 144, thus restraining and holding link 144. While so restrained, bail base mounting plate 135 remains stationary and consequently bail member 133 remains in open disposition. In FIG. 12, latching dog 148 is shown engaged with latch 149, thus retaining the bail 113 in open disposition. At this time, spring 142 provides a force urging bail base 135 in a clockwise direction as shown in FIG. 10, or into a disposition providing for closed or line retrieval mode in bail 113.

Latching dog 148 is disposed at the right angled tip end of pivotally mounted locking member 150, with this member being pivotally secured to the surface of web 118 by the shank of screw 151. Locking member 150 which extends through a slot formed in web 118 is provided with a cam follower surface as at 152, this cam follower surface being arranged to strike cam screw 153 when locking member 150 is disposed in latched or locking position relative to link 144. This motion is accommodated by means of spring 154 which provides a tensile force between mounting post 154a and the arm portion of latch member 150, such as is shown at 155.

As best seen in FIG. 12, with tension being exerted by spring 154 against arm 155 of locking member 150, latching dog 148 engages latch zone 149 on link 144. This clockwise motion in member 150 arranges to dispose cam follower surface 152 in an arcuate path intersecting the outwardly extending or protruding portion of cam screw 153. The disposition of cam follower surface 152 is illustrated graphically in FIG. 11 wherein the relative locations of cam screw 153 and cam follower surface 152 are shown. Therefore, while latching dog 148 is engaged in latch zone 149, counter-clockwise rotation of the winding hub assembly 78 will result in contact between cam follower 152 and camming screw 153, with this motion tilting latching arm 150 in a counter-clockwise direction about the shank of pivot screw 151, thereby removing dog 148 from the confines of latch zone 149 to release link 144. When so released, the force of spring 142 acting upon pin 138 is adequate to permit bail 113 to snap into the casting mode. Such motion is accommodated by a clockwise rotation of that portion of the bail base mounting plate 135 shown in FIGS. 10 and 12.

If desired, cam surface 152 may be arranged to pass over cam screw 153 in one arcuate direction of travel only. Thus, by providing suitable dimensions for the slot formed in web 118 along with appropriately formed abutment surface at 160, rotational motion in the winding hub assembly 78 will be possible in only one arcuate direction of travel.

Attention is now directed to FIG. 13 of the drawings wherein a modified form of latching and locking means is illustrated. The operation of the structure of FIG. 13 is fundamentally similar to that of the structure shown in FIGS. 10, 11 and 12, and hence the same numbers are used to identify similar parts or components for the two systems. It will also be appreciated that the only distinctions between the structures shown in FIGS. 10, 11 and 12, as compared to the structure shown in FIG. 13, is in the means for controlling the motion of the bail structure 113. With attention being directed to that portion of the structure shown in FIG. 13 illustrating the shield casing 117, it will be seen that the bail base mounting plate 170 is pivotally secured to shield casing 117 by means of a pivotal mounting pin shown at 171. Bail base member 170 is provided with an inwardly extending pin 172 which is received within the confines of arcuately formed slot 173, slot 173 being formed within the body of shroud member 117. A second inwardly extending pin is provided on bail base mounting plate 135, as shown at 174, this pin providing a means of coupling to link 176. Link 176 has a slot area 177 formed therein, with the free end 145 of post 88 being adapted to be received within the confines of slot 177. Upon advancing of winding hub assembly 78 to its forwardmost position, tip end 145 of post 88 will contact the extreme right hand portion of slot 177 of link 176, thereby providing for motion in bail mounting base 170 in a counter-clockwise direction, as viewed in FIG. 13. Upon continued motion in a counter-clockwise direction, tension spring 179 which is anchored to the body at 180 will function in a toggle-like fashion to assist in the continued movement of bail base mounting plate 170 in a counter-clockwise direction.

Figure 14:
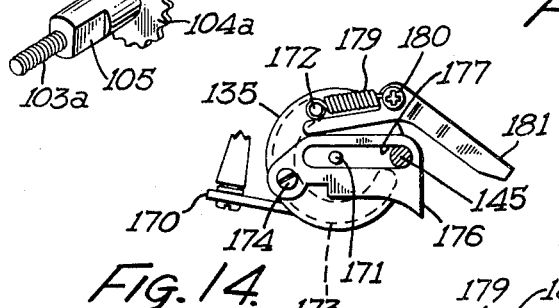
FIGS. 14, 15 and 16 are detail plan views of the bail actuating mechanism shown in the structure of FIG. 13, with FIG. 14 showing the bail in its closed disposition, FIG. 15 illustrating the structure with the bail in open disposition, and with FIG. 16 illustrating the structure at a point in the operational cycle when the bail is undergoing a change from the open or casting mode to the closed or line retrieval mode.
Figure 15:
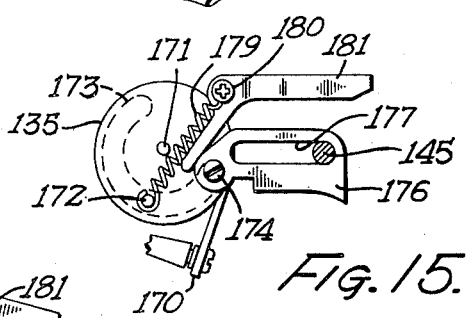
Figure 16:
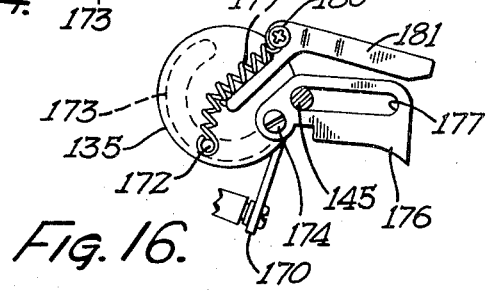

Pivotally mounted toggle actuating arm 181 is provided to assist in the automatic changeover of the bail from the open or casting disposition to the closed or line retrieval disposition. The motions in toggle actuating arm 181 are shown in FIGS. 14, 15 and 16, and reference is made to these views for a clear understanding of the operations during the occurrence of changeover. In this connection, FIG. 14 illustrates the disposition of the mechanism while in the line retrieval mode. FIG. 15, for example, illustrates the disposition of the structure when in the open or casting mode, it being observed that link 176 has moved or otherwise rotated bail base mounting plate 170 in a clockwise direction from that position illustrated in FIG. 14. Spring member 179 will retain the components in this disposition until arm 181 moves in a counter-clockwise direction, as shown in FIG. 16, to move bail mounting member 170 in a counter-clockwise direction, until the disposition of FIG. 14 is reached.

With attention being re-directed to FIG. 13, it will be observed that motion of arm 181 is obtained by virtue of the disposition of camming ramp 182, the surface of camming ramp 182 striking the cam follower surface 183 on the tip of arm 181. As is apparent from the structures shown in FIGS. 14, 15 and 16, contact between camming ramp 182 and cam follower surface 183 is only possible while the bail is in the open or casting mode, since physical displacement of the cam follower surface occurs when the structure is in the closed or line retrieval mode.

In the embodiment shown in FIGS. 9–16, means may be provided to assist in snubbing or arresting the line during the casting operation. If desired, a resilient rubber ring may be provided as has been discussed in connection with the embodiment shown in FIGS. 1–8, however, it has been found that an inwardly extending flange element such as is illustrated at 186 in FIG. 13 may be provided. In such a structure, the leading or outer edge of element 186 is preferably utilized to engage the inner surface of the outer flange of the line spool.

I claim:
1. A fishing reel of the open-face spinning type mountable on a fishing pole, comprising:
   a. a line spool mounted within said reel with its axis substantially parallel to said pole;
   b. a contoured pay-out lip adjacent the outermost perimeter of said line spool, whereby said line may be permitted to pay-out axially from said spool with reduced friction;
   c. a substantially circular ring of resilient material having an inside diameter less than the outside diameter of said pay-out lip, and support means therefor mounted to position said ring substantially coaxially with said line spool, the axis of said ring being defined as a line normal to the plane of and through the center of said ring;
   d. means responsive to the control of the fisherman's hand for bringing said ring into substantially uniform engagement with said pay-out lip, thereby to arrest said axial pay-out of line from said spool, said control responsive means comprising a lever having a fulcrum and being arranged to move said resilient ring support means in a forward direction to effect said engagement of said resilient ring and said pay-out lip of said line spool;
   e. said resilient ring support means comprising a sleeve housing slidable forward against a compression spring, whereby said ring of resilient material recedes from said engagement when said lever is released; and
   f. an axially fixed but rotatable housing shell on which are mounted a bail and line guide, thereby to form a rotatable housing assembly, and means are associated with said housing assembly for rotating said bail about its mounting axis to an open position in which said bail and line guide are not in contact with said line, said opening of said bail occurring in response to forward motion of said sleeve housing, thereby initiating the casting mode.

2. The invention set forth in claim 1 further defined in that there are included a crank and means for rotating said sleeve housing and said rotatable housing assembly together and for causing axial reciprocation of said line spool in response to turning of said crank to re-wind the line, and means responsive to said forward motion of said sleeve housing for disengaging said reciprocation means and simultaneously positioning said line spool substantially at the outer-most limit of its reciprocation, whereby said line spool is automatically pre-positioned for said casting mode.

3. The invention set forth in claim 2 in which are included cam means responsive to rotation of said housing assembly to cause return of said bail to the closed position in response to turning of said crank to initiate the line retrieval mode, said cam means being continuously positioned axially by said reciprocation means and said cam means being located so as to respond to said rotation of said housing assembly at a position other than said casting mode position of said spool.

4. In a spinning reel having frame means, a rotatable winding assembly mounted on said frame means, a bail and line guide mounted upon said rotatable winding assembly, a crank, drive means operatively coupling said winding assembly to said crank, line spool mounting means, a line spool mounted upon said spool mounting means and secured axially thereon to move in an axial direction with said spool mounting means; and associated first and second mechanical linkages, with said first mechanical linkage causing said winding assembly and bail and line guide to rotate and with said second mechanical linkage including an element for functionally disengaging said line spool mounting means from said drive means, with said second mechanical linkage normally causing the line spool mounting means to reciprocate for re-wind of the line upon said line spool, said bail and line guide having two stable dispositions defining a closed line retrieval and an open line dispensing mode respectively, the combination comprising:
  a. first positioning linkage means for producing pre-positioning of said line spool and spool mounting means outwardly to a casting mode disposition, said first positioning linkage means functionally disengaging said second mechanical linkage from said drive means;
  b. cam means responsive to rotation of said winding assembly for closing said bail to said line retrieval mode to initiate line retrieval, said cam means being operative at an axial position of said line spool other than said outward pre-position; and
  c. means for functionally re-engaging said second mechanical linkage in response to turning of said crank, thereby producing an intentional delay in actuation of said cam means after the initiation of cranking.

5. The invention set forth in claim 4 being particularly characterized in that said winding assembly includes a housing and has latch means mounted thereon, and said bail has a notched cam means mounted thereon, and spring means are coupled to and extend between said bail and said winding assembly housing respectively, the arrangement being such that the closing of said bail by action of said cam means includes disengagement of said latch means, with said spring means producing snap-action closing of said bail.

6. The invention set forth in claim 5 in which said closing of said bail by action of said cam means includes disengagement of said latch associated with said bail from said notch cam means, and wherein said spring means produces snap-action closing of said bail.

7. In a spinning reel having frame means, a rotatable winding assembly including a line bail mounted thereon, the bail having associated bail actuating linkages to establish a stable open line casting mode and a stable closed line retrieval mode, a crank, drive means operatively coupling said winding assembly to said crank, line spool mounting means, a line spool axially retained upon said line spool mounting means, and said drive means including associated first mechanical drive linkages for causing said winding assembly to rotate and second mechanical drive linkages for causing the line spool mounting means to reciprocate for re-wind of the line, with said second mechanical drive linkages including an element for functionally disengaging said line spool mounting means from said drive means, the combination comprising:
  a. means for moving said line spool outwardly while on said spool mounting means for positioning said line spool in a casting mode while simultaneously disengaging an element of said second mechanical drive linkage;
  b. cam means secured to said frame means and having associated linkage means, said cam means and associated linkage means being functionally responsive to the disposition of said line spool and to the rotation of said winding assembly following outward positioning of said line spool for controllably moving said bail actuating linkages, to close said bail and to establish a line retrieval mode, said cam means and associated mechanical linkage means being further functionally disengaged from said bail actuating linkages while said bail is in the closed line retrieval mode; and
  c. means for re-engaging said disengageable elements of said second drive linkage with said reciprocation means in response to turning of said crank, thereby producing an intentional delay in actuation of said cam means after the initiation of cranking.

8. The spinning reel structure as defined in claim 7 being particularly characterized in that resilient biasing means are coupled to said rotatable winding assembly for normally urging said winding assembly toward the forward surface of said frame means, said frame means having a forward abutting surface in contact with said line spool when said line spool is in normal disposition, said rotatable winding assembly having mounting means for shifting axial movement thereof outwardly from contact with said frame means while simultaneously moving said line spool outwardly to said casting mode.

9. The spinning reel structure as defined in claim 7 being particularly characterized in that said bail is provided with locking means for releasably retaining said bail in open line casting mode, and tripping means for releasing said locking means for closing said bail by action of said cam means and including disengagement of said bail retaining means upon initial rotation of said winding assembly following outward positioning of said line spool.

10. In a spinning reel having frame means, a rotatable winding assembly mounted upon said frame means and including a winding hub assembly operatively coupled to said frame means, a bail mounted upon said winding hub and being rockable between a stable open line casting mode and a stable closed line retrieval mode, toggle means resiliently releasable restraining said bail in one of said modes, a line spool mounting means having mechanical linkages coupled thereto for driving said line spool mounting means in a reciprocatory path, a line spool mounted upon said spool mounting means and axially secured thereon to move in an axial direction with said spool mounting means along said reciprocatory path, a crank and associated mechanical linkages for causing said winding assembly to rotate and the line spool mounting means to reciprocate for rewinding the line;

a. said frame means including a rearwardly disposed base housing assembly, with said winding assembly being forwardly disposed thereon, spindle means coupled to said frame means and extending within said base housing assembly and within said winding assembly and having means for receiving said line spool mounting means adjacent the forward tip thereof, abutment surface means at the forward end of said base housing assembly, for receiving the rearward end of said winding hub assembly, push rod means having a normal retracted disposition and being secured to said base housing assembly and being adapted to engage said winding hub and to move said winding hub forwardly along said spindle means upon forward movement of said push rod means;

b. means coupled to said winding hub for moving said line spool mounting means outwardly with said spindle means with forward motion of said winding hub;

c. cam means coupled to said base housing assembly and being disposed generally along the abutment surface; and d. linkage means coupled to said bail including arm means responsive to said cam means and being spring biased and rockable between first and second stable dispositions with said first and second stable dispositions responding to open and closed modes respectively of said bail, said linkage means having cam follower means disposed adjacent the base end of said housing assembly and adapted to contact said cam means upon rotation of said winding hub assembly in the normal disposition thereof for rocking said cam arm means to said second stable disposition.

11. The spinning reel apparatus as defined in claim 10 being particularly characterized in that said push rod means is operatively coupled to control lever means disposed externally of said frame means.

12. The spinning reel apparatus as defined in claim 10 being particularly characterized in that linkage means are provided for releasably retaining said line spool mounting means in outwardly advanced disposition along said spindle means.

13. The spinning reel apparatus as defined in Claim 10 being particularly characterized in that said cam means coupled to said winding hub assembly have an abutment surface thereon to prevent winding motion along one direction, thereby permitting uni-directional winding motion between said winding hub assembly and said frame means.

* * * * *